United States Patent
Chen et al.

(10) Patent No.: US 9,547,299 B2
(45) Date of Patent: Jan. 17, 2017

(54) INTELLIGENT CONTROL MODULE, INTELLIGENT LIGHTING CEILING FAN, INTELLIGENT LIGHTING CEILING FAN REMOTE CONTROLLER AND INTELLIGENT LIGHTING CEILING FAN CONTROL METHOD

(71) Applicants: Shih-Yun Chen, Hsinchu (TW); Chi-Han Jao, Taichung (TW); Chun-Hung Chen, Taichung (TW)

(72) Inventors: Shih-Yun Chen, Hsinchu (TW); Chi-Han Jao, Taichung (TW); Chun-Hung Chen, Taichung (TW)

( * ) Notice: Subject to any disclaimer, the term of this patent is extended or adjusted under 35 U.S.C. 154(b) by 0 days.

(21) Appl. No.: 14/737,777

(22) Filed: Jun. 12, 2015

(65) Prior Publication Data

US 2016/0363920 A1    Dec. 15, 2016

(51) Int. Cl.
*H05B 37/02* (2006.01)
*G05B 19/042* (2006.01)

(52) U.S. Cl.
CPC ....... *G05B 19/0426* (2013.01); *H05B 37/0272* (2013.01)

(58) Field of Classification Search
CPC .................. G05B 19/0426; H05B 37/0272

USPC ......................... 315/152, 153, 178
See application file for complete search history.

(56) References Cited

U.S. PATENT DOCUMENTS 5,528,229 A * 6/1996 Mehta ................... F04D 25/088
                                                    165/247
2015/0325112 A1* 11/2015 McPherson ....... H04W 72/0453
                                                    455/419

* cited by examiner

*Primary Examiner* — Daniel D Chang
(74) *Attorney, Agent, or Firm* — Chun-Ming Shih; HDLS IPR Services (57) ABSTRACT

An intelligent lighting ceiling fan control method comprises following steps: receiving a first lighting ceiling fan control signal; transferring first lighting ceiling fan control signal to a lighting ceiling fan control module for adjusting the brightness of a lighting device or the rotation rate of a fan device; configuring a timing control profile data according to a user operation; generating and transferring a second lighting ceiling fan control signal to the lighting ceiling fan control module according to the timing control profile data for adjusting the brightness of the lighting device or the rotation rate of the fan device when a trigger time is past. This application can effectively make the lighting ceiling fan automatically operate according to the trigger time, and provide better user experiences to the user.

16 Claims, 7 Drawing Sheets

INTELLIGENT CONTROL MODULE, INTELLIGENT LIGHTING CEILING FAN, INTELLIGENT LIGHTING CEILING FAN REMOTE CONTROLLER AND INTELLIGENT LIGHTING CEILING FAN CONTROL METHOD

BACKGROUND OF THE INVENTION

Field of the Invention

The technical field relates to control module, lighting ceiling fan, lighting ceiling fan remote controller and lighting ceiling fan control method and more particularly related to intelligent control module, intelligent lighting ceiling fan, intelligent lighting ceiling fan remote controller and intelligent lighting ceiling fan control method.

Description of Related Art

The lighting ceiling fan is always the most common functional decoration of the indoor decoration for a long time. Besides the decoration function, the lighting ceiling fan can further simultaneously provide the fan function and the lighting function, and can have the effect of the aesthetics and the practicality. Besides, because the installation height is far greater than that of the ordinary fan (for example, the lighting ceiling fan can be installed on the ceiling of the house), the efficiency of adjusting the temperature of the lighting ceiling fan is better than the efficiency of adjusting the temperature of the ordinary fan (because the top-down airflow generated by the lighting ceiling fan is not easily blocked by the other home appliances having a lower installation height, the efficiency of air-circulating and the efficiency of temperature-adjusting of the lighting ceiling fan are better than the ordinary fan.). Because of above advantages, the lighting ceiling fan is more and more popular.

However, because the user often manually turns on/off the related-art lighting ceiling fan to control the related-art lighting ceiling fan to be enabled/disabled, and the related-art lighting ceiling fan doesn't comprise the function of automatic control, the related-art lighting ceiling fan provides the poor user experience to the user.

Therefore, there is a need to find out a better and more effective solution to handle such problems.

SUMMARY OF THE INVENTION

The object of the disclosed example is to provide an intelligent control module, an intelligent lighting ceiling fan, an intelligent lighting ceiling fan remote controller and an intelligent lighting ceiling fan control method having an automatic timing control function.

One of the exemplary embodiments, an intelligent control module, comprising: a first transmission module connected to a lighting ceiling fan control module; a control signal receiving module receiving a first lighting ceiling fan control signal or a timing control signal; a memory; a timer; and a processor electrically connected to the first transmission module, the control signal receiving module, the memory and the timer, comprising: a processing module transferring the first lighting ceiling fan control signal to the lighting ceiling fan control module via the first transmission module for adjusting a brightness of a lighting device electrically connected to the lighting ceiling fan control module or a rotation rate of a fan device electrically connected to the lighting ceiling fan control module, or configuring a timing control profile data according to the timing control signal, and storing the configured timing control profile data in the memory, wherein the timing control profile data comprises a trigger time and a timing control operation parameter; and a timing control module connected to the processing module, the timing control module generating and transferring a second lighting ceiling fan control signal to the lighting ceiling fan control module for adjusting the brightness of the lighting device or the rotation rate of the fan device when the timer determines that the trigger time is past.

One of the exemplary embodiments, an intelligent lighting ceiling fan, comprising: an intelligent control module of describing in the preceding paragraph; a fan device; a lighting device; and a lighting ceiling fan control module electrically connected to the fan device and the lighting device being connected to the first transmission module of the intelligent control module.

One of the exemplary embodiments, an intelligent lighting ceiling fan remote controller, comprising: an intelligent control module of describing in the preceding paragraph; a human-machine interface electrically connected to the intelligent control module accepting a user operation and generating the first lighting ceiling fan control signal or the timing control signal according to the accepted user operation.

One of the exemplary embodiments, an intelligent lighting ceiling fan control method, comprising: a) receiving a first lighting ceiling fan control signal; b) transferring the received first lighting ceiling fan control signal to a lighting ceiling fan control module for adjusting a brightness of a lighting device electrically connected to the lighting ceiling fan control module or a rotation rate of a fan device electrically connected to the lighting ceiling fan control module; c) configuring a timing control profile data according to a user operation, wherein the timing control profile data comprises a trigger time and a timing control operation parameter; and d) generating and transferring a second lighting ceiling fan control signal to the lighting ceiling fan control module according to the timing control operation parameter for adjusting the brightness of the lighting device or the rotation rate of the fan device when the trigger time is past.

This present disclosed example can make the lighting ceiling fan automatically operate without the user manually turning on/off, and can provide the better user experience.

DETAILED DESCRIPTION OF THE INVENTION

In cooperation with the attached drawings, the technical contents and detailed description of the present invention are described thereinafter according to a preferable embodiment, being not used to limit its executing scope. Any equivalent variation and modification made according to appended claims is all covered by the claims claimed by the present invention.

Figure 1:
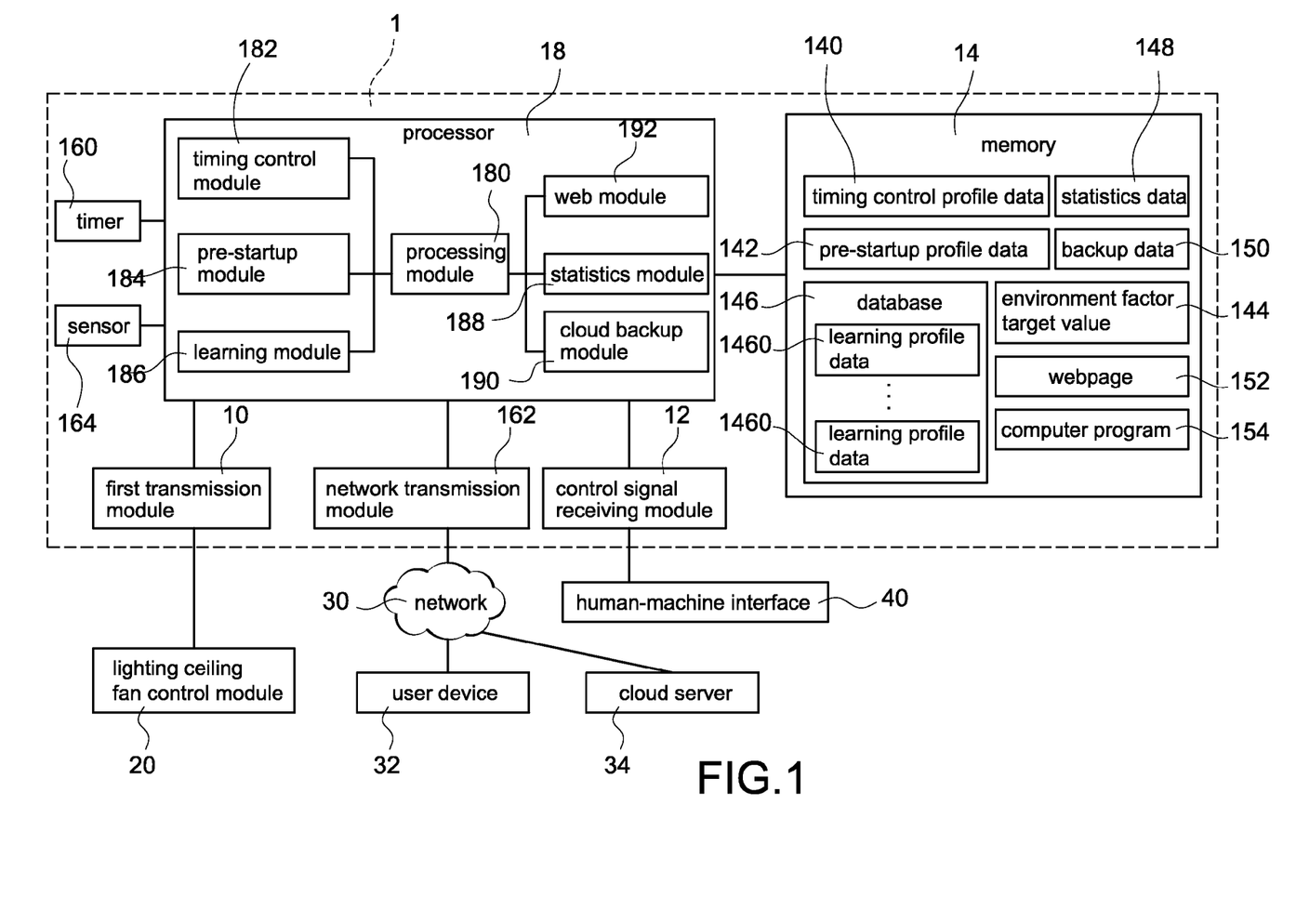
FIG. 1 is an architecture diagram of an intelligent control module according to a first embodiment of the present disclosed example.

First, please refer to FIG. 1, which illustrates an architecture diagram of an intelligent control module according to a first embodiment of the present disclosed example. As shown in FIG. 1, the intelligent control module 1 of the present disclosed example mainly comprises a first transmission module 10, a control signal receiving module 12, a memory 14, a timer 160 and a processor 18. The processor 18 is electrically connected to the first transmission module 10, the control signal receiving module 12, the memory 14 and the timer 160.

The first transmission module 10 is connected to an external lighting ceiling fan control module 20. More specifically, the first transmission module 10 can forward a lighting ceiling fan control signal from the processor 10 to the external lighting ceiling fan control module 20 to make the lighting ceiling fan control module 20 adjust a brightness of a lighting device (such as a lighting device 22 shown in FIG. 2 or FIG. 4) electrically connected to the lighting ceiling fan control module 22 or a rotation rate of a fan device (such as a fan device 24 shown in FIG. 2 or FIG. 4) electrically connected to the lighting ceiling fan control module 20 according to the received lighting ceiling fan control signal.

Please note that the lighting ceiling fan control module 20, the lighting device 22 and the fan device 24 are installed in a lighting ceiling fan (such as a lighting ceiling fan 2 shown in FIG. 2 or a lighting ceiling fan 2' shown in FIG. 4) together.

Preferably, the first transmission module 10 is wiredly connected (such as connecting via Ethernet cable, signal control cable or Power Line Communication (PLC)) to a second transmission module (such as a second transmission module 200 shown in FIG. 2) of the lighting ceiling fan control module 20, but this specific example is not intended to limit the scope of the disclosed example.

In another embodiment of the disclosed example, the first transmission module 10 can be wirelessly connected (such as connecting via Bluetooth wireless communication, Infrared (IR) wireless communication, radio frequency (RF) wireless communication, Zigbee wireless communication or Z-Wave wireless communication) to the second transmission module 200 (such as a second transmission module 200 shown in FIG. 3) of the lighting ceiling fan control module 20.

The control signal receiving module 12 is connected to a human-machine interface 40, and can receive a first lighting ceiling fan control signal or a timing control signal from the human-machine interface 40. More specifically, a user can operate the human-machine interface 40 (such as touching a virtual button displayed in a touchscreen or pressing a physical button of a remote controller). When the user operates the human-machine interface 40 under a manual mode, the human-machine interface 40 can send the first lighting ceiling fan control signal to the control signal receiving module 12. When the user operates the human-machine interface 40 under a timing control mode, the human-machine interface 40 can send the timing control signal to the control signal receiving module 12. The processor 18 executes the corresponded procedure according to the first lighting ceiling fan control signal or the timing control signal received by the control signal receiving module 12.

Preferably, the control signal receiving module 12 is wiredly connected (such as connecting via Ethernet cable, signal control cable or Power Line Communication (PLC)) to the human-machine interface 40, but this specific example is not intended to limit the scope of the disclosed example.

In another embodiment of the disclosed example, the control signal receiving module 12 can be wirelessly connected (such as connecting via Bluetooth wireless communication, Infrared (IR) wireless communication, radio frequency (RF) wireless communication, Zigbee wireless communication or Z-Wave wireless communication) to the human-machine interface 40.

The memory 14 is used to store data, such as a timing control profile data 140 used for automatic timing control (described later). Preferably, the memory 14 is Hard Disk Drive (HDD), flash memory or register, but this specific example is not intended to limit the scope of the disclosed example.

The processor 18 mainly comprises a processing module 180. The processor module 180 can transfer the first lighting ceiling fan control signal received from the human-machine interface 40 to the lighting ceiling fan control module 20 via the first transmission module 10 for controlling the lighting ceiling fan control module 20 to adjust the brightness of the lighting device 22 or the rotation rate of the fan device 24.

Besides, the processor 180 can configure the timing control profile data 140 and store the timing control profile data 140 in the memory 14 according to the timing control signal received from the human-machine interface 40. Preferably, the timing control profile data 140 comprises a trigger time.

The timer 160 is used to time. The processor 18 further comprises a timing control module 182 connected to the processing module 180. When the timer 160 determines that the trigger time is past, the timing control module 182 generates and transfers a second lighting ceiling fan control signal to the lighting ceiling fan module 20 for making the lighting ceiling fan module 20 adjust the brightness of the lighting device 20 or the rotation rate of the fan device 24 according to the timing control profile data 140.

More specifically, the timing control profile data 140 further comprises a timing control operation parameter (such as a brightness-adjusting parameter for the lighting device 22 or a rotation-rate-adjusting parameter for the fan device 24). The timing control module 182 generates the second lighting ceiling fan control signal according to the timing control operation parameter.

In another embodiment of the disclosed example, the intelligent control module 1 can further comprises a pre-startup mode. Under the pre-startup mode, the intelligent control module 1 can trigger the lighting ceiling fan control module 20 to automatically control the lighting device 22 and/or the fan device 24 to turn on/off according to a distance between a position of the intelligent control module 1 and a position of the user.

More specifically, the intelligent control module 1 further comprises a network transmission module 162 electrically connected to the processor 18, the network transmission module 162 is connected to an external user device 32 via a network 30. The intelligent control module 1 retrieves a user position from the user device 32 via the network transmission module 162. Preferably, the network 30 is internet; the network transmission module 162 establishes a network connection with the user device 32 via internet.

The memory 14 further comprises a pre-startup profile data 142. Preferably, the pre-startup profile data 142 comprises a lighting ceiling fan position, a distance threshold and a pre-startup operation parameter. The processor 18 further comprises a pre-startup module connected to the processing module 180.

The pre-startup module 184 can generating a third lighting ceiling fan control signal according to the pre-startup parameter (such as the brightness-adjusting parameter for the lighting device 22 or the rotation-rate-adjusting parameter for the fan device 24) when a distance between the user position and the lighting ceiling fan position is less than the distance threshold. Then, the pre-startup module 184 can transfer the generated third lighting ceiling fan control signal to the lighting ceiling fan control module 20 for making the lighting ceiling fan control module 20 adjust the brightness of the lighting device 22 or the rotation rate of the fan device 24 via the first transmission module 10.

For example, if the intelligent control module 1 is installed at home, the user device 32 is carried by the user. The pre-startup profile data 142 is pre-configured by the user or pre-configured before leaving the manufactory.

The user device 32 periodically sends the user position (such as retrieving the current position of the user device 32 via a Global Positioning System (GPS) module of the user device 32) to the intelligent control module 1 via the network 30.

After the intelligent control module 1 enters the pre-startup mode, the intelligent control module 1 can determine whether the distance between the user position and the position of home is less than the distance threshold (such as 500 meters), and can trigger the lighting ceiling fan control module 20 to turn on the lighting device 22 and the fan device 24 when the distance is less than the distance threshold. In other words, above-mentioned pre-startup mode provides an automatic turn-on function. Thus, when the user arrives home, the user can immediately enjoy the best indoor temperature and lighting, and can feel the user experience as the user's family waiting for him/her at home.

Moreover, the intelligent control module 1 can automatically trigger the lighting ceiling fan control module 20 to turn off the lighting device 22 and the fan device 24 when the distance between the user position and the position of home is not less than the distance threshold. In other words, above-mentioned pre-startup mode provides an automatic turn-off function. Thus, even the user forgets to manually turn off the lighting device 22 or the fan device 24, the intelligent control module 1 of this embodiment can automatically turn off the lighting device 22 or the fan device 22 when the user has left home away. This embodiment of the disclosed example can prevent from unnecessary waste of power, and can achieve the technical efficacy of power-saving.

Moreover, the intelligent control module 1 can further retrieve a current time via the timer 160, and can enter the pre-startup mode for achieving above function only in the fixed time interval (such as the time interval pre-configured by the user), such as enabling the automatic turn-off function during the user's office hour, enabling the automatic turn-on function during the user's non-office hour. Thus, the intelligent control module 1 of this embodiment can effectively reduce the probability of misjudging that the user has left home or arrived home. For example, the user passes through the vicinity of the user's home during the user's office hour, the intelligent control module 1 will not determine that the user will come back home, and will not automatically turn on the lighting device 22 and/or the fan device 24.

Please note that although the user device 32 transfers the user position to the intelligent control module 1 for calculation in this embodiment, this specific example is not intended to limit the scope of the disclosed example.

In another embodiment of the disclosed example, the user device 32 stores the lighting ceiling fan position and the distance threshold of the pre-startup profile data 142, calculates the distance between the user position and the lighting ceiling fan position, transfers a pre-startup trigger signal to the intelligent control module 1 for triggering the intelligent control module 1 to transfer the third lighting ceiling fan control signal to the lighting ceiling fan control module 20 for controlling the lighting device 22 or the fan device 24 to turn on/off when the distance is less than the distance threshold.

In another embodiment of the disclosed example, the intelligent control module 1 further comprises a sensor 164 electrically connected to the processor 18. The sensor 164 is used to retrieve an environment factor sense value. The memory 14 further stores an environment factor target value 144. The processing module 180 calculates and transfers a fourth lighting ceiling fan control signal to the lighting ceiling fan control module 20 for adjusting the brightness of the lighting device 22 or the rotation rate of the fan device 24 according a difference value between the environment factor sense value and the environment factor target value 144.

Preferably, the sensor 164 is a temperature sensor, a humidity sensor or a brightness sensor. When the sensor 164 is the temperature sensor, the environment factor sense value is a temperature value of a space of the intelligent control module 1 being installed. When the sensor 164 is the humidity sensor, the environment factor sense value is a humidity value of the space of the intelligent control module 1 being installed. When the sensor 164 is the brightness sensor, the environment factor sense value is a brightness value of a space of the intelligent control module 1 being installed.

For example, if the sensor 164 is the temperature sensor, the environment factor target value 144 is 25 degrees Celsius. After the processing module 180 enter a thermostatic automatic control mode, the processing module 180 retrieves the current environment factor sense value (In this embodiment, take the current environment factor sense value being 30 degrees Celsius for example.) via the sensor 164. The processing module 180 calculates the difference value between the environment factor sense value and the environment factor target value 144 (In this embodiment, the difference value is 5 degrees Celsius.), calculates and transfers the fourth lighting ceiling fan control signal to the lighting ceiling fan control module 20 for adjusting the rotation rate of the fan device 24 (such as adjusting the rotation rate to level 5) according to the calculated difference value.

In another embodiment of the disclosed example, if the environment factor sense value drops to 27 degrees Celsius, the processing module 180 can calculate the difference value between the environment factor sense value and the environment factor target value 144 (In this example, the different value is 2 degrees Celsius.) after the processing module 180 enters the thermostatic automatic control mode.

Then, the processing module 180 calculates and transfers the fourth lighting ceiling fan control signal to the lighting ceiling fan control module 20 for adjusting the rotation rate of the fan device 24 (such as adjusting the rotation rate to level 2) according to the difference value. Thus, the present disclosed example can effectively keep the temperature, the humidity and the brightness of the indoor space at fixed values, and can provide the better user experience to the user.

In another embodiment of the disclosed example, the intelligent control module 1 can enter a learning mode, and can achieve a learning function of the operation parameters under the learning mode.

Following description is used to explain how the present disclosed example achieves to the learning function. In this embodiment, the memory 14 further comprises a database 146 stored a plurality of learning profile data 1460. Preferably, the plurality of learning profile data 1460 is respectively corresponded to a plurality of operation parameters being respectively used in the past statuses respectively corresponding to the plurality of different environment factor sense values by the intelligent module 1.

The processor 18 further comprises a learning module 186. The learning mode 186 is connected to the processing mode 180. The learning mode 186 retrieves the current environment factor sense value via the sensor 164, and selects one of the plurality of learning profile data 1460 from the database 146 according to the retrieved environment factor sense value. Then, the learning mode 186 generates and transfers a fifth lighting ceiling fan control module to the lighting ceiling fan control module 20 for adjusting the brightness of the lighting device 22 or the rotation rate of the fan device 24 according to the selected learning profile data 1460. Preferably, the selected learning profile data 1460 is corresponded to the current environment factor sense value.

For example, the intelligent control module 1 had be configured to execute the level 1 wind-speed when the intelligent control module 1 entered the learning mode in the past and the environment factor sense value was 25 degrees Celsius. The intelligent control module 1 had be configured to execute the level 2 wind-speed when the intelligent control module 1 entered the learning mode in the past and the environment factor sense value was 26 degrees Celsius. And the intelligent control module 1 had be configured to execute the level 3 wind-speed when the intelligent control module 1 entered the learning mode in the past and the environment factor sense value is 27 degrees Celsius. The learning module 186 can make above configuration parameter (the level 1 wind-speed, the level 2 wind-speed and the level 3 wind-speed) be corresponded to the environment factor sense value executed at the time (25 degrees Celsius, 26 degrees Celsius and 27 degrees Celsius), and can store in the database 146 as the three learning profile data 1460.

When the intelligent control module 1 enters the learning mode again, the learning mode 186 can retrieve the current environment factor sense value (take 26 degrees Celsius for example), and selects the learning profile data 1460 corresponding to the retrieved environment factor sense value (in this example, the selected learning profile data 1460 is the level 2 wind-speed), generates and transfers the fifth lighting ceiling fan control signal to the lighting ceiling fan control module 20 for adjusting the rotation rate of the fan device 24 to the level 2 wind-speed according to the selected learning profile data 1460. Thus, the present disclosed example can effectively make the lighting device 22 and the fan device 24 automatically operate according to the usage habits of the user.

In another embodiment of the disclosed example, the intelligent control module 1 can enter a statistic mode. And the intelligent control module can execute a statistic function under the statistic mode.

Following description is used to explain how the present disclosed example achieves the statistic function. In this embodiment, the network transmission module 162 is connected to the user device 32 or a cloud server 34 via the network 30. The processor 18 further comprises a statistic module 188. The statistic module 188 is connected to the processing module 180. The statistic module 188 can calculate a statistic data 148 and can store the calculated statistic data 14 in the memory 14. The statistic module 188 transfers the statistic data 148 to the user device 32 or the cloud server 34 when connect to the network 30 via the network transmission module 162.

Preferably, the statistic data 148 can comprise a plurality of environment factor sense values, environment factor target values or lighting ceiling fan power consumption values respectively recorded in a plurality of time points (such as every noon) of a statistical time interval (such as one month). Thus, the statistic module 188 of this present disclosed example can effectively record and compile the operation history of the lighting ceiling fan 2, and can provide the statistics data 148 of the lighting ceiling fan 2 to the user to let the user know the operation-related information of the lighting ceiling fan 2.

In another embodiment of the disclosed example, the intelligent control module 1 can enter a cloud backup mode. When the intelligent control module 1 is under the cloud backup mode, the intelligent control module 1 executes a cloud backup function.

Following description is used to explain how the present disclosed example achieves to the cloud backup function. In this embodiment, the network transmission module 162 is connected to the cloud server 34 via the network 30. The processor 18 further comprises a cloud backup module 190. The cloud backup module 190 connected to the processing module 180 is used to generate a backup data 150 and temporarily stores the generated backup data 150 in the memory 14. When the cloud backup module 190 is connected to the cloud server 34 via the network transmission module 162, the cloud backup module 190 can transfer the backup data 150 to the cloud server 34 for backing up data.

Preferably, the backup data 150 comprises a profile data of the intelligent control module 1 or an operation record of the lighting ceiling fan 2 (such as the timing control profile data 140, the pre-startup profile data 142, the environment factor target value 144, the learning profile data 1460, the statistics data 148 or any combination of the above data), but this specific example is not intended to limit the scope of the disclosed example.

Thus, when the user replaces or adds a new intelligent control module 1, the new intelligent control module 1 can download the backup data 150 from the cloud server 34 to make the new intelligent control module 1 directly operate according to the backup data 150. The present disclosed example can effectively omit the step of the user manually configuring the parameters of the new intelligent control module 1, and can provide better configuration convenience.

In another embodiment of the disclosed example, the intelligent control module 1 provides a web operation function. More specifically, in this embodiment, the network transmission module 162 is connected to the network 30. The memory 14 further comprises a webpage 152. The processor 18 further comprises a web module 192 providing a browsing service of the webpage via the network transmission module 162. The web module 192 accepts a user operation via the webpage 152, and generates the control signal (such as the first lighting ceiling fan control signal, the second lighting ceiling fan control signal, the third lighting ceiling fan control signal, the fourth lighting ceiling fan control signal or the fifth lighting ceiling fan control signal) for adjusting the brightness of the lighting device 22 or the rotation rate of the fan device 24 according to the accepted user operation.

Furthermore, the web module 192 can further make the operation-related information of the lighting ceiling fan 2 be represented in the webpage 152. Thus, the user can remotely control the lighting ceiling fan 2 via the webpage 152, or can obtain the current represented operation information of the lighting ceiling fan 2 from the webpage 152.

Please note that the processing module 180, the timing control module 182, the pre-startup module 184, the learning module 186, the statistic module 188, the cloud backup module 190, the web module 192 may be implemented by hardware modules like electronic circuit or integrated circuit with recorded digital circuits, or implemented by software modules, e.g. program or Application Programming Interface (API), but are not limited to aforementioned examples. When aforementioned modules are implemented by software modules, the connections between the modules mean the links of the programs.

When the processing module 180, the timing control module 182, the pre-startup module 184, the learning module 186, the statistic module 188, the cloud backup module 190, the web module 192 are implemented by software modules, the memory 14 can further store a computer program 154, the computer program 154 contains computer-executable program codes or machine codes used to implement aforementioned modules. When the processor 18 executes computer-executable program codes or the machine codes, the processor 18 can implement the functions of aforementioned modules.

Figure 2:
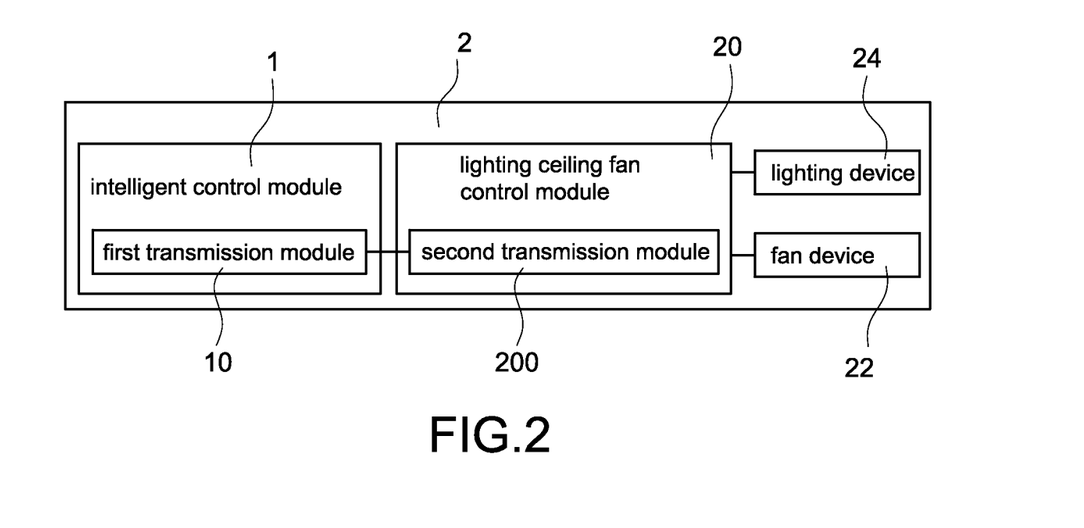
FIG. 2 is an architecture diagram of an intelligent lighting ceiling fan according to a second embodiment of the present disclosed example.

Please refer to FIG. 2, which is an architecture diagram of an intelligent lighting ceiling fan according to a second embodiment of the present disclosed example. As shown in FIG. 2, the lighting ceiling fan 2 comprises the intelligent control module 1, the lighting ceiling fan control module 20, the lighting device 22 and the fan device 24. The lighting ceiling fan control module 20 is electrically connected to the lighting device 22 and the fan device 24. The first transmission module 10 of the intelligent control module 1 is wiredly/wirelessly connected to the second transmission module 200. The intelligent control module 1 shown in FIG. 2 is similar to the intelligent control module 1 shown in FIG. 1, the relevant description is omitted for brevity.

Preferably, the first transmission module 10 is removably electrically connected the second transmission module 200 via a plurality of metal pins, but this specific example is not intended to limit the scope of the disclosed example. Thus, the intelligent control module 1 can be easily installed on the lighting ceiling fan 2 or removed from the lighting ceiling fan 2.

Please note that the lighting ceiling fan 2 can become the intelligent lighting ceiling fan and can execute the aforementioned functions (such as the timing control function, the pre-startup function, the learning function the statistic function or the cloud backup function) via making the intelligent control module 1 is installed on the inside of the lighting ceiling fan 2.

Figure 3:
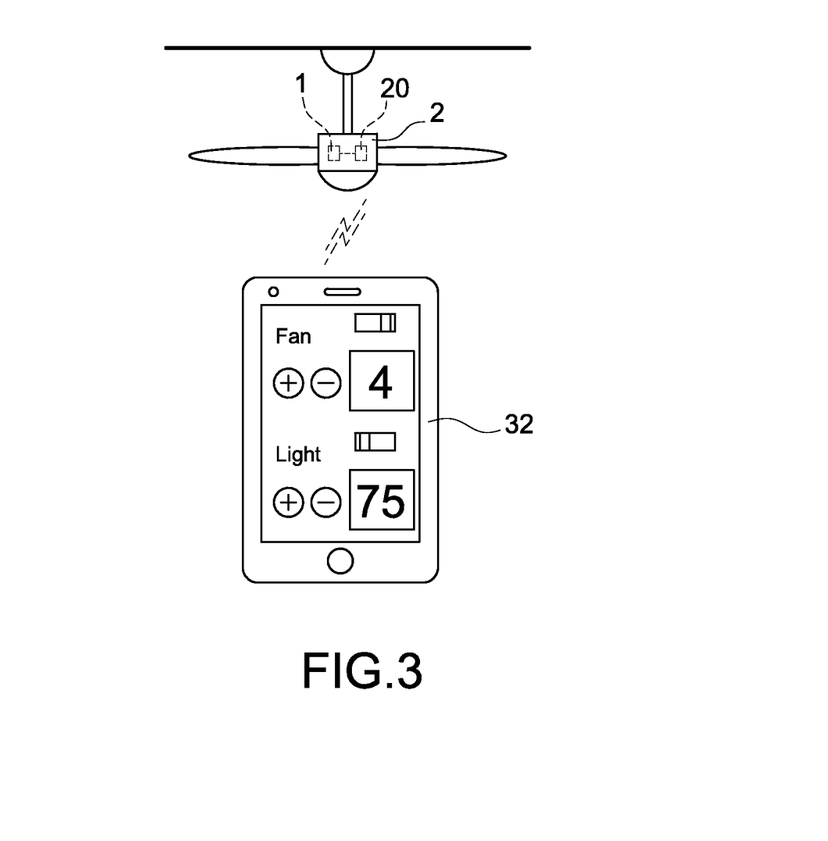
FIG. 3 is an appearance schematic view of an intelligent lighting ceiling fan according to a first embodiment of the present disclosed example.

Please refer to FIG. 3, which is an appearance schematic view of an intelligent lighting ceiling fan according to a first embodiment of the present disclosed example. FIG. 3 is used to explain a usage scenario of the lighting ceiling fan 2.

As shown in FIG. 3, the user can remotely control the lighting ceiling fan 2 having installed the intelligent control module 1 via using the user device 32 being connected to the network 30. More specifically, the user device 32 is a smartphone. After the user device 32 executes an application program, the user device 32 can display a Graphical User Interface (GUI). The GUI can comprise at least one display zone and a plurality of virtual buttons. The plurality of virtual buttons are used to accept the user operation, the display zone is used to display the current operation information of the lighting ceiling fan 2.

When the user device 32 accepts the user operation (such as an operation of turning on the lighting device) via the GUI, the user device 32 can generate and transfer the control signal (such as the first lighting ceiling fan control signal) corresponding to the accepted user operation to the intelligent control module 1. Then, the intelligent control signal transfers the received control signal (such as the first lighting ceiling fan control signal) to the lighting ceiling fan control module 20 for controlling the lighting device 22 and/or the fan device 24 of the lighting ceiling fan 2.

Figure 4:
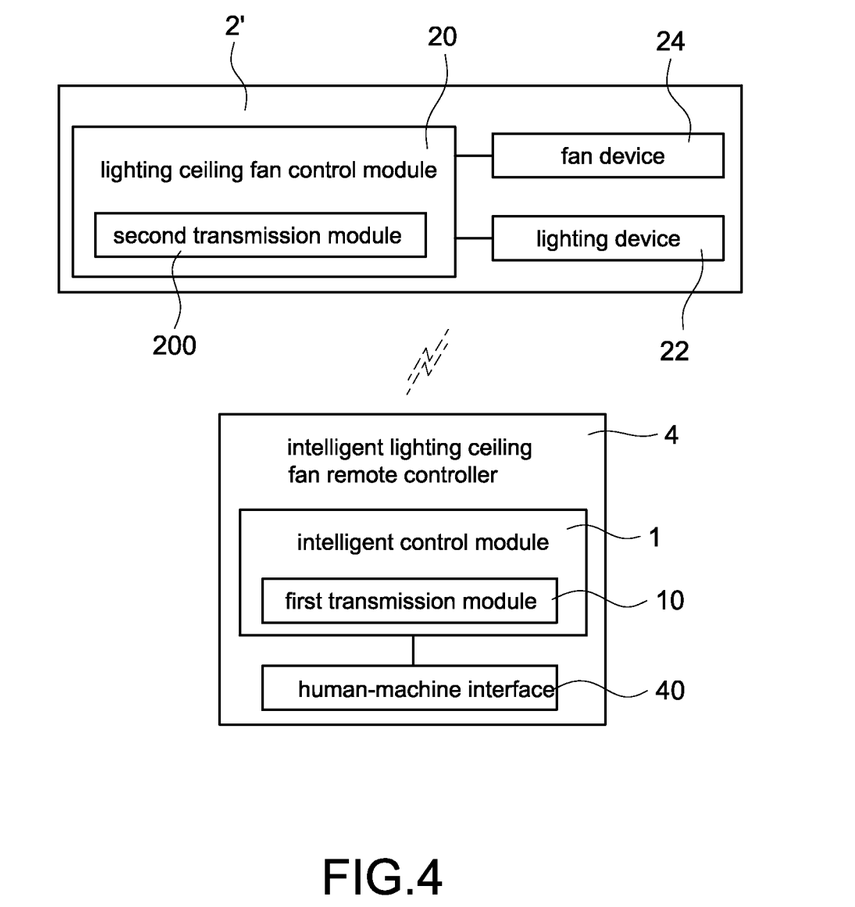
FIG. 4 is an architecture diagram of an intelligent lighting ceiling fan remote controller according to a second embodiment of the present disclosed example.

Please refer to FIG. 4, which is an architecture diagram of an intelligent lighting ceiling fan remote controller according to a second embodiment of the present disclosed example. As shown in FIG. 4, in this embodiment, an intelligent lighting ceiling fan remote controller 4 comprises the intelligent control module 1 and the human-machine interface 40. The intelligent control module 1 is electrically connected to the human-machine interface 40, and is wirelessly connected to the second transmission module 200 of the lighting ceiling fan control module 20 of the lighting ceiling fan 2' via the first transmission module 10. The intelligent control module 1 shown in FIG. 4 is similar to the intelligent control module 1 shown in FIG. 1, the relevant description is omitted for brevity.

Please note that the lighting ceiling fan 2' could be the ordinary lighting ceiling fan without the automatic control function. In other words, the lighting ceiling fan 2' doesn't comprise the intelligent control module 1. The intelligent lighting ceiling fan remote controller 4 can transfer a wireless control signal to the lighting ceiling fan 2' being compatible with the ordinary lighting ceiling fan to make the lighting ceiling fan 2' achieve the automatic control efficacy via the first transmission module 10 of the intelligent control module 1.

More specifically, in this embodiment, the intelligent control module 1 is installed in the intelligent lighting ceiling fan remote controller 4 to replace the original remote controller of the lighting ceiling fan 2'. The intelligent lighting ceiling fan remote controller 4 can achieve the aforementioned functions (such as the timing control function, the pre-startup function, the learning function, the statistics function and the cloud backup function) via transferring the various control signals (such as the first lighting ceiling fan control signal, the second lighting ceiling fan control signal, the third lighting ceiling fan control signal, the fourth lighting ceiling fan control signal or the fifth lighting ceiling fan control signal) to the lighting ceiling fan 2'.

Thus, the user only needs to buy the intelligent lighting ceiling fan remote controller 4 to make the ordinary lighting ceiling fan 2' be with the intelligent-lighting-ceiling-fan-related function. The user can effectively save the cost of replacing the lighting ceiling fan 2'.

Figure 5:
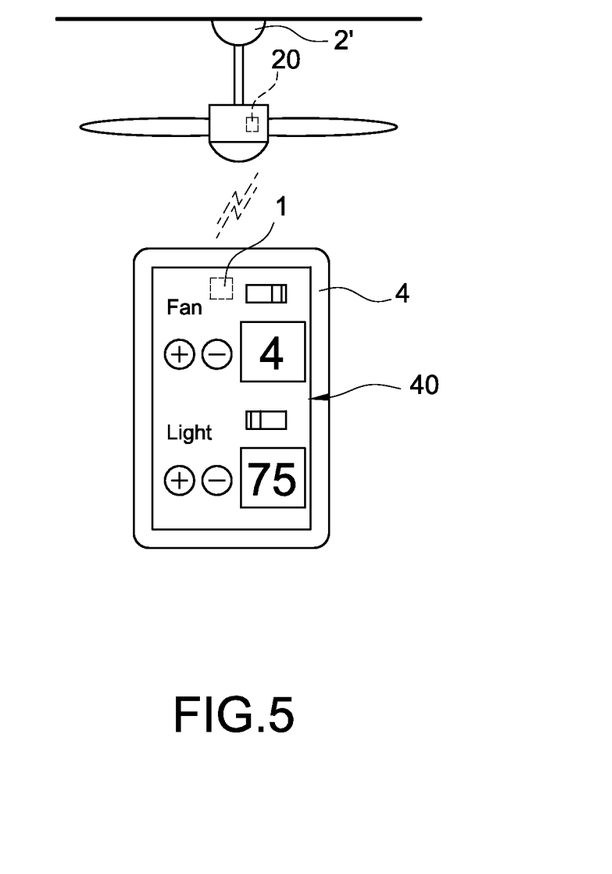
FIG. 5 is an appearance schematic view of an intelligent lighting ceiling fan remote controller according to a first embodiment of the present disclosed example.

Please refer to FIG. 5, which is an appearance schematic view of an intelligent lighting ceiling fan remote controller according to a first embodiment of the present disclosed example. FIG. 5 is used to explain a usage scenario of the lighting ceiling fan remote controller 4.

As shown in FIG. 5, the inside of the lighting ceiling fan remote controller 4 is installed intelligent control module 1, and the surface of the lighting ceiling fan remote controller is installed the human-machine interface 40. In this embodiment, the human-machine interface 40 is the combination of a keypad and a display.

The user can input the user operation (such as operation of turning on the lighting device) via operating the keypad (the human-machine interface 40). After the intelligent control module 1 accepts the inputted user operation via the human-machine interface 4, the intelligent control module 1 can generate the control signal (such as the first lighting ceiling fan control signal) corresponding to the user operation, and can wirelessly transfer the generated control signal to the lighting ceiling fan control module 20 of the lighting ceiling fan 2' to control the lighting device 22 or the fan device 24 of the lighting ceiling fan 2' (such as controlling the lighting device 22 to turn on).

Figure 6:
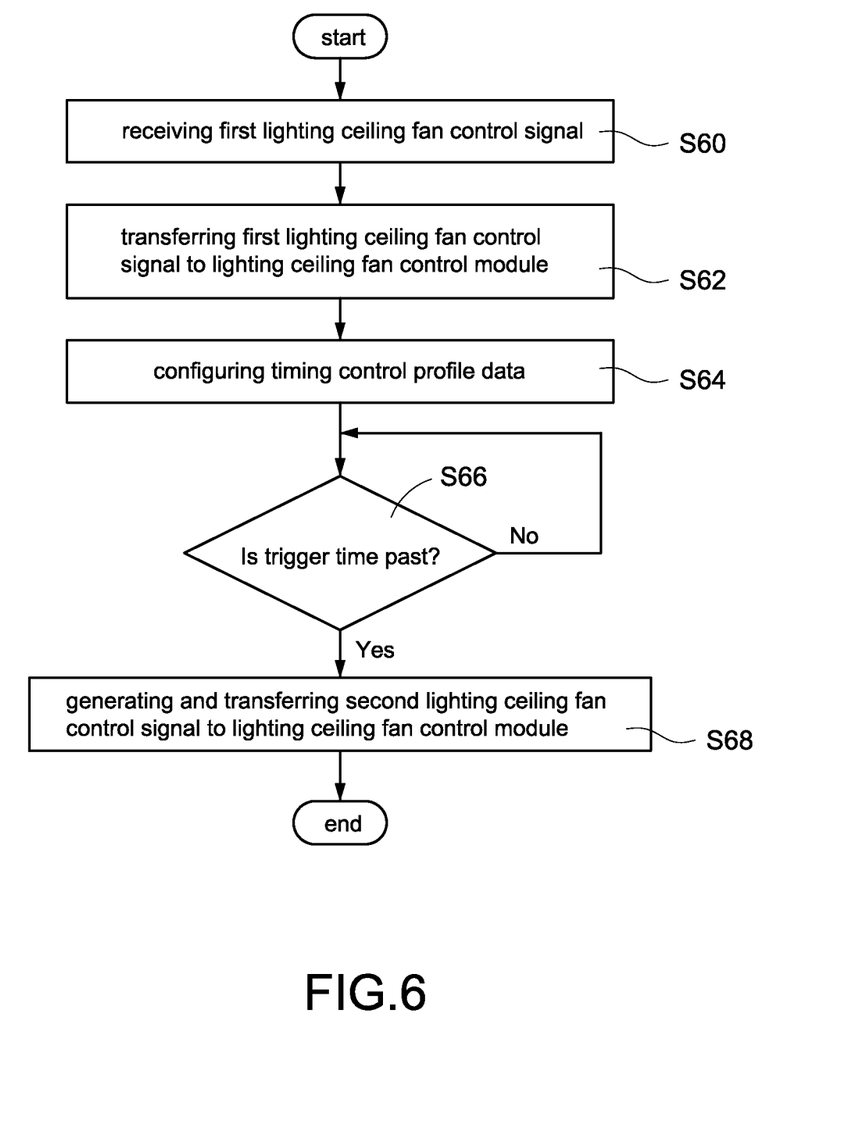
FIG. 6 is a flowchart of an intelligent lighting ceiling fan control method according to a first embodiment of the present disclosed example.

Please refer to FIG. 6, which is a flowchart of an intelligent lighting ceiling fan control method according to a first embodiment of the present disclosed example. The intelligent lighting ceiling fan control method of this embodiment is mainly performed by the intelligent control module 1 shown in FIG. 1.

Step S60: receive the first lighting ceiling fan control signal. More specifically, the intelligent control module 1 receives the first lighting ceiling fan control signal corresponding to the user operation from the human-machine interface 40 via the control signal receiving module 12, from the user device 32 via the network 30, or via the webpage 152.

Step S62: transfer the first lighting ceiling fan control signal to the lighting ceiling fan control module 20. More specifically, the processor 18 transfers the first lighting ceiling fan control signal to the lighting ceiling fan control module 20 to make the lighting ceiling fan control module 20 adjust the brightness of the lighting device 22 or the rotation rate of the fan device 24 according to the first lighting ceiling fan control signal.

Step S64: configure timing control profile data 140. More specifically, the intelligent control module 1 receives another user operation from the human-machine interface 40 via the control signal receiving module 12, from the user device 32 via the network 30, or via the webpage 152. And the intelligent control module 1 configures the timing control profile data 140 according to the accepted user operation. Preferably, the timing control profile data 140 comprises the trigger time and the timing control operation parameter.

Step S66: determine whether the trigger time is past. More specifically, the intelligent control module 1 determines whether the trigger time is past via the timer 160. If the trigger time is past, the intelligent control module 1 performs the step S68. Otherwise, the intelligent control module 1 repeatedly performs the step S66 to continuously determine whether the trigger time is past.

Step S68: generate and transfer the second lighting ceiling fan control signal to lighting ceiling fan control module 20. More specifically, when the intelligent control module 1 determines that the trigger time is past via timer 160, the intelligent control module 1 generates the second lighting ceiling fan control signal according to the timing control operation parameter of the timing control profile data 140, and transfers the generated second lighting ceiling fan control signal to the lighting ceiling fan control module 20 for adjusting the brightness of the lighting device 22 or the rotation rate of the fan device 24 via the first transmission module 10.

Please note that the steps S64-S68 are performed before the steps S60-S62 in FIG. 6, but this specific example is not intended to limit the scope of the disclosed example. There aren't order relationship and relation dependency relationship between the steps S60-S62 and the steps S64-S68. The intelligent control module 1 can only perform the step S60-S62, and doesn't perform the steps S64-S68. Or the intelligent control module 1 can first perform the step S64-S68, and perform the steps S64-S68 after the steps S64-S68 are performed. The order relationship between the steps S60-S62 and the steps S64-S68 and whether perform the steps S60-S62 or the steps S64-S68 can be arbitrarily adjusted according to a requirement of the user.

Figure 7A:
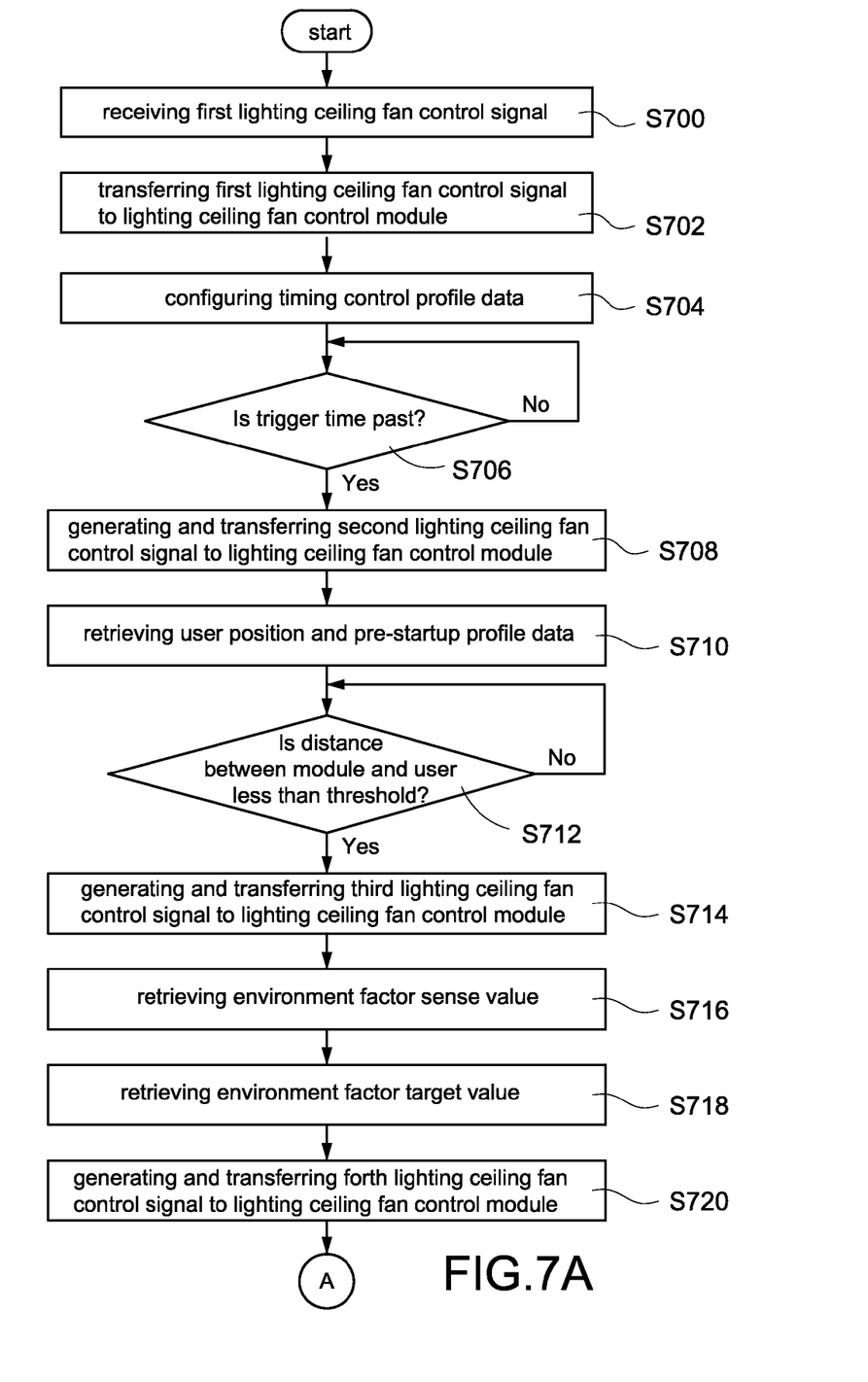
FIG. 7A is a first flowchart of an intelligent lighting ceiling fan control method according to a second embodiment of the present disclosed example.
Figure 7B:
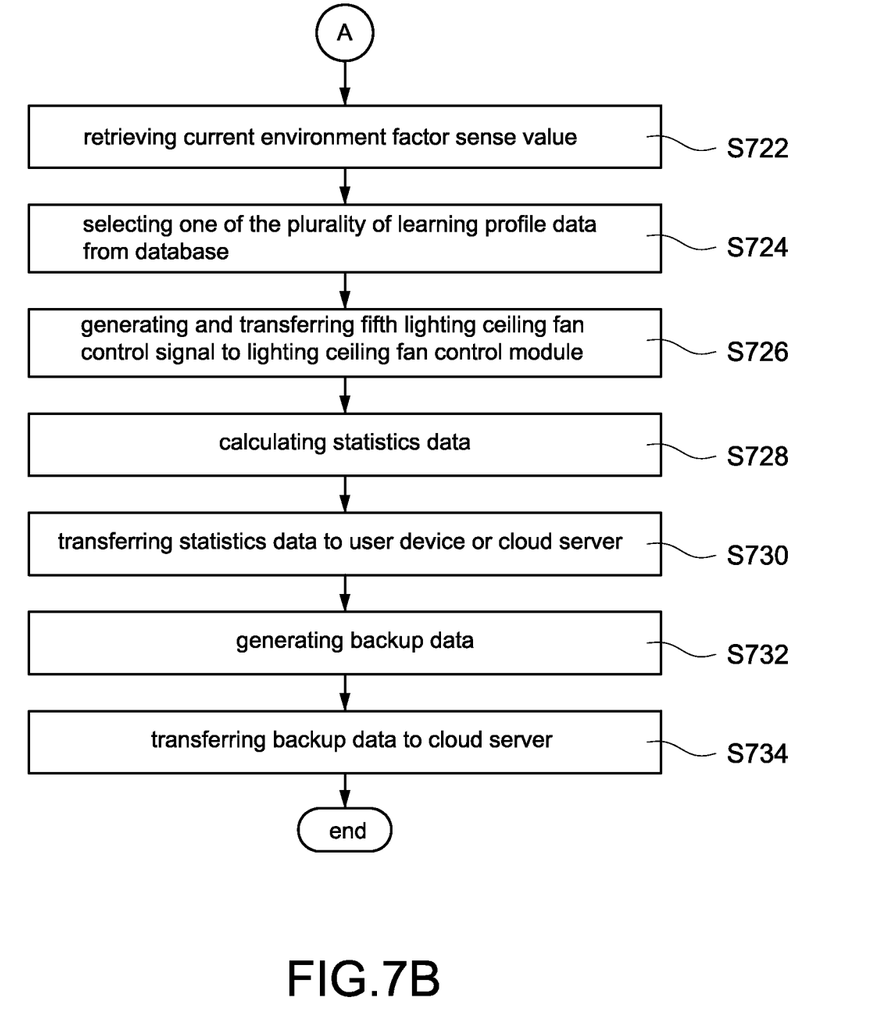
FIG. 7B is a second flowchart of an intelligent lighting ceiling fan control method according to a second embodiment of the present disclosed example.

Please refer to FIG. 7A and FIG. 7B. FIG. 7A is a first flowchart of an intelligent lighting ceiling fan control method according to a second embodiment of the present disclosed example. FIG. 7B is a second flowchart of an intelligent lighting ceiling fan control method according to a second embodiment of the present disclosed example. The intelligent lighting ceiling fan control method of this embodiment is mainly performed by the intelligent control module 1 shown in FIG. 1.

Step S700: receive the first lighting ceiling fan control signal.

Step S702: transfer the first lighting ceiling fan control signal to lighting ceiling fan control module 20.

Step S704: configure the timing control profile data 140. Preferably, the timing control profile data 140 comprises the trigger time and the timing control operation parameter.

Step S706: determine whether the trigger time is past. If the trigger time is past, the intelligent control module 1 performs the step S708. Otherwise, the intelligent control module 1 repeatedly performs the step S706 to continuously determine whether the trigger time is past.

Step S708: generate and transfer the second lighting ceiling fan control signal to lighting ceiling fan control module 20.

Step S710: retrieve the user position and pre-startup profile data 142. More specifically, the intelligent control module 1 can retrieve the user position via the network 30, and retrieves the pre-startup data 142 from the memory 14. Preferably, the pre-startup data 142 is pre-configured by the user and comprises the lighting ceiling fan position, the distance threshold and the pre-startup operation parameter.

Step S712: determine whether the distance between the intelligent control module 1 and the user is less than threshold. More specifically, the intelligent control module 1 calculates the distance between the user position and the lighting ceiling fan position, and determines whether the calculated distance Step S714: generate and transferring the third lighting ceiling fan control signal to the lighting ceiling fan control module 20. More specifically, the intelligent control module 1 generates the third lighting ceiling fan control signal according to the pre-startup operation parameter of the pre-startup data 142, and transfers the generated third lighting ceiling fan control signal to the lighting ceiling fan control module 20 for adjusting the brightness of the lighting device 22 or the rotation rate of the fan device 24 via the first transmission module 10.

Step S716: retrieve environment factor sense value. More specifically, the intelligent control module 1 retrieves the current environment factor sense value corresponding to the environment around the sensor 164 via the sensor 164. Preferably, the environment factor sense value is the humidity value or the brightness value, but this specific example is not intended to limit the scope of the disclosed example.

Step S718: retrieve the environment factor target value. More specifically, the intelligent control module 1 retrieves the environment factor target value 144 from the memory 14. Preferably, the environment factor target value 144 is pre-configured by the user and stored in the memory 14.

Step S720: generate and transfer the fourth lighting ceiling fan control signal to lighting ceiling fan control module 20. More specifically, the intelligent control module 1 calculates the difference value between the environment factor sense value and the environment factor target value 144, calculates the fourth lighting ceiling fan control signal according to the calculated difference value, and transfers the calculated fourth lighting ceiling fan control signal to the lighting ceiling fan control module 20 for adjusting the brightness of the lighting device 22 or the rotation rate of the fan device 24 via the first transmission module 10.

Step S722: retrieve the current environment factor sense value. More specifically, the intelligent control module 1 retrieves the current environment factor sense value corresponding to the environment around the sensor 164.

Step S724: select one of the plurality of the learning profile data 1460 from the database 146. More specifically, the intelligent control module 1 selects the learning profile data 1460 corresponding to the current environment factor sense value from the plurality of the learning profile data 1460 stored in the database 146. Preferably, the plurality of the learning profile data 1460 is respectively corresponded to the plurality of operation parameters being respectively used in the past statuses respectively corresponding to the plurality of different environment factor sense values.

Step S726: generate and transfer the fifth lighting ceiling fan control signal to lighting ceiling fan control module 20. More specifically, the intelligent control module 1 generates the fifth lighting ceiling fan signal according to the selected learning profile data 1460, and transfers the generated fifth lighting ceiling fan signal to the lighting ceiling fan control module 20 for adjusting the brightness of the lighting device 22 or the rotation rate of the fan device 24 via the first transmission module 10.

Step S728: calculating the statistics data 148. More specifically, the intelligent control module 1 can calculate the statistics data 148, and store the calculated statistics data 148 in the memory 14. Preferably, the statistics data 148 can comprise the plurality of environment factor sense values, environment factor target values or lighting ceiling fan power consumption values respectively recorded in the plurality of time points (such as daily 20:00) of the statistical time value (such as one week).

Step S730: transfer the statistics data 148 to the user device 32 or the cloud server 34. More specifically, the intelligent control module 1 transfers the calculated statistics data 148 to the user device 32 or the cloud server 34 via the network transmission module 162.

Step S732: generate the backup data 150. More specifically, the intelligent control module 1 generates the backup data 150 and temporarily stores the generated backup data 150 in the memory 14. Preferably, the backup data 150 comprises the profile data of the intelligent control module 1 or the operation record of the lighting ceiling fan 2, 2' (such as the timing control profile data 140, the pre-startup profile data 142, the environment factor target value 144, the learning profile data 1460, the statistics data 148 or any combination of the above data), but this specific example is not intended to limit the scope of the disclosed example.

Step S734: transfer the backup data 150 to cloud server 34. More specifically, the intelligent control module 1 is connected to the cloud server 34 via the network transmission module 162, and transfers the generated backup data 150 to the cloud server 34 for backing up data.

Please note that there aren't order relationship and relation dependency relationship between the steps S700-S702, the steps S704-S708, the steps S710-S714, the steps S716-S720, the steps S722-S726, the steps S728-S730 and the steps S732-S734 in FIG. 7A and FIG. 7B. The order relationship between the steps S700-S702, the steps S704-S708, the steps S710-S714, the steps S716-S720, the steps S722-S726, the steps S728-S730 and the steps S732-S734 and whether perform the steps S700-S702, the steps S704-S708, the steps S710-S714, the steps S716-S720, the steps S722-S726, the steps S728-S730 or the steps S732-S734 cab be arbitrarily adjusted according to a requirement of the user.

This present disclosed example can make the lighting ceiling fan automatically operate without the user manually turning on/off, and can provide the better user experience.

The present disclosed example can effectively keep the temperature, the humidity and the brightness of the indoor space at fixed values, and can provide the better user experience to the user.

The present disclosed example can effectively make the lighting device 22 and the fan device 24 automatically operate according to the usage habits of the user.

This present disclosed example can effectively record and compile the operation history of the lighting ceiling fan, and can provide the statistics data of the lighting ceiling fan to the user to lead the user to know the operation-related information of the lighting ceiling fan.

The present disclosed example can effectively omit the step of the user manually configuring the parameters of the new intelligent control module, and can provide better configuration convenience.

In cooperation with the attached drawings, the technical contents and detailed description of the present invention are described thereinafter according to a preferable embodiment, being not used to limit its executing scope. Any equivalent variation and modification made according to appended claims is all covered by the claims claimed by the present invention.

What is claimed is:

1. An intelligent control module, comprising:
   a first transmission module connected to a lighting ceiling fan control module;
   a control signal receiving module receiving a first lighting ceiling fan control signal or a timing control signal;
   a memory, storing a pre-startup profile data, wherein the pre-startup profile data comprises a lighting ceiling fan position, a distance threshold and a pre-startup operation parameter;
   a timer;
   a network transmission module, connecting to a user device to retrieve a user position via internet; and
   a processor electrically connected to the network transmission module, the first transmission module, the control signal receiving module, the memory and the timer, comprising:
      a processing module transferring the first lighting ceiling fan control signal to the lighting ceiling fan control module via the first transmission module for adjusting a brightness of a lighting device electrically connected to the lighting ceiling fan control module or a rotation rate of a fan device electrically connected to the lighting ceiling fan control module, or configuring a timing control profile data according to the timing control signal, and storing the configured timing control profile data in the memory, wherein the timing control profile data comprises a trigger time and a timing control operation parameter;

a timing control module connected to the processing module, the timing control module generating and transferring a second lighting ceiling fan control signal to the lighting ceiling fan control module for adjusting the brightness of the lighting device or the rotation rate of the fan device when the timer determines that the trigger time is past; and a pre-startup module connected to the processing module generating and transferring a third lighting ceiling fan control signal to the lighting ceiling fan control module for adjusting the brightness of the lighting device or the rotation rate of the fan device according to the pre-startup parameter when a distance between the user position and the lighting ceiling fan position is less than the distance threshold.

2. The intelligent control module of claim 1, further comprising:

a sensor electrically connected to the processor retrieving an environment factor sense value, wherein the memory further stores an environment factor target value, the processing module calculates and transfers a fourth lighting ceiling fan control signal to the lighting ceiling fan control module for adjusting the brightness of the lighting device or the rotation rate of the fan device according to a difference value between the environment factor sense value and the environment factor target value.

3. The intelligent control module of claim 2, wherein the sensor is a temperature sensor or a humidity sensor.

4. The intelligent control module of claim 1, further comprising:

a sensor electrically connected to the processor retrieving an environment factor sense value, wherein the memory further comprises a database storing a plurality of learning profile data, the plurality of learning profile data is respectively corresponded to a plurality of operation parameters being respectively used in the past statuses respectively corresponding to the plurality of different environment factor sense values by the intelligent control module, the processor further comprises:

a learning module connected to the processing module selecting one of the plurality of learning profile data according to the current environment factor sense value, generating and transferring a fourth lighting ceiling fan control signal to the lighting ceiling fan control module for adjusting the brightness of the lighting device or the rotation rate of the fan device according to the selected learning profile data.

5. The intelligent module of claim 1, wherein the processor comprises:

a statistics module connected to the processing module calculating and transferring a statistics data to the user device or a cloud server via the network transmission module.

6. The intelligent control module of claim 5, wherein the statistics data comprises a plurality of environment factor sense values, environment factor target values or lighting ceiling fan power consumption values respectively recorded in a plurality of time points of a statistical time interval.

7. The intelligent control module of claim 1, wherein the network transmission module connects to a cloud server via internet, the processor further comprises:

a cloud backup module connected to the processing module generating a backup data, and transferring the backup data to the cloud server for backing up data via internet.

8. The intelligent control module of claim 1, wherein the memory further stores a webpage; the processor further comprises:

a web module providing a browsing service of the webpage, accepting a user operation via the webpage, and generating the first lighting ceiling fan control signal or the second lighting ceiling fan control signal according to the accepted user operation.

9. An intelligent lighting ceiling fan, comprising:

an intelligent control module of claim 1;
a fan device;
a lighting device; and
a lighting ceiling fan control module electrically connected to the fan device and the lighting device being connected to the first transmission module of the intelligent control module.

10. An intelligent lighting ceiling fan remote controller, comprising:

an intelligent control module of claim 1;
a human-machine interface electrically connected to the intelligent control module accepting a user operation and generating the first lighting ceiling fan control signal or the timing control signal according to the accepted user operation.

11. An intelligent lighting ceiling fan control method, comprising:

a) receiving a first lighting ceiling fan control signal;
b) transferring the received first lighting ceiling fan control signal to a lighting ceiling fan control module for adjusting a brightness of a lighting device electrically connected to the lighting ceiling fan control module or a rotation rate of a fan device electrically connected to the lighting ceiling fan control module;
c) configuring a timing control profile data according to a user operation, wherein the timing control profile data comprises a trigger time and a timing control operation parameter;
d) generating and transferring a second lighting ceiling fan control signal to the lighting ceiling fan control module according to the timing control operation parameter for adjusting the brightness of the lighting device or the rotation rate of the fan device when the trigger time is past;
e) retrieving a user position and a pre-startup profile data, wherein the pre-startup profile data comprises a lighting ceiling fan position, a distance threshold and a pre-startup operation parameter; and
f) generating and transferring a third lighting ceiling fan control signal to the lighting ceiling fan control module for adjusting the brightness of the lighting device or the rotation rate of the fan device according to the pre-startup parameter when a distance between the user position and the lighting ceiling fan position is less than the distance threshold.

12. The intelligent lighting ceiling fan control method of claim 10, further comprising following steps:

g) retrieving an current environment factor sense value via a sensor;
h) retrieving a pre-stored environment factor target value; and
i) calculating and transferring a fourth lighting ceiling fan control signal to the lighting ceiling fan control module for adjusting the brightness of the lighting device or the rotation rate of the fan device according to a difference value between the environment factor sense value and the environment factor target value.

13. The intelligent lighting ceiling fan control method of claim 10, further comprising following steps:
j) retrieving an current environment factor sense value via a sensor;
k) selecting one of a plurality of pre-stored learning profile data from a database according to the retrieved environment factor sense value, wherein the plurality of learning profile data are respectively corresponded to a plurality of operation parameters being respectively used in the past statuses respectively corresponding to the plurality of different environment factor sense values by the intelligent control module; and
l) generating and transferring a fourth lighting ceiling fan control signal to the lighting ceiling fan control module for adjusting the brightness of the lighting device or the rotation rate of the fan device according to the selected learning profile data.

14. The intelligent lighting ceiling fan control method of claim 10, further comprising following steps:
m) calculating a statistics data; and
n) transferring the calculated statistics data to a user device or a cloud server via internet.

15. The intelligent lighting ceiling fan control method of claim 14, wherein the statistics data comprises a plurality of environment factor sense values, environment factor target values or lighting ceiling fan power consumption values respectively recorded in a plurality of time points of a statistical time value.

16. The intelligent lighting ceiling fan control method of claim 10, further comprising following steps:
o) generating a backup data, wherein the backup data comprises the timing control profile data; and
p) transferring the backup data to a cloud server for backup via internet.

* * * * *